US012579685B2

(12) United States Patent
Li et al.

(10) Patent No.: US 12,579,685 B2
(45) Date of Patent: Mar. 17, 2026

(54) SYSTEM AND METHOD FOR PERFORMING A CAMERA TO GROUND ALIGNMENT FOR A VEHICLE

(71) Applicant: GM GLOBAL TECHNOLOGY OPERATIONS LLC, Detroit, MI (US)

(72) Inventors: Binbin Li, Columbus, OH (US); Xinyu Du, Oakland Township, MI (US); Yao Hu, Sterling Heights, MI (US); Hao Yu, Troy, MI (US); Wende Zhang, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 274 days.

(21) Appl. No.: 18/500,395

(22) Filed: Nov. 2, 2023

(65) Prior Publication Data

US 2025/0148639 A1    May 8, 2025

(51) Int. Cl.
| | |
|---|---|
| *G06T 7/73* | (2017.01) |
| *G06V 10/44* | (2022.01) |
| *G06V 10/762* | (2022.01) |
| *G06V 20/56* | (2022.01) |

(52) U.S. Cl.
CPC .............. *G06T 7/74* (2017.01); *G06V 10/44* (2022.01); *G06V 10/762* (2022.01); *G06V 20/588* (2022.01); *G06T 2207/30256* (2013.01)

(58) Field of Classification Search
CPC ............. G06T 7/74; G06T 2207/30256; G06T 2207/30244; G06T 2207/30252; G06V 10/44; G06V 10/762; G06V 20/588
See application file for complete search history.

(56) References Cited

U.S. PATENT DOCUMENTS

2008/0239076 A1*  10/2008  Luo ..................... G06V 20/584
                                                    348/148
2014/0078258 A1*   3/2014  Chandraker ........... G06T 7/579
                                                    348/46
2018/0365858 A1*  12/2018  Kim ......................... G06T 7/13

FOREIGN PATENT DOCUMENTS

DE       102022126312 A1     8/2023

OTHER PUBLICATIONS

Choi, Jung, Suhr; Automatic Calibration of an Around View Monitor System Exploiting Lane Markings;Sensors, 2018, 18. Jg., Nr. 9, S. 2956.

(Continued)

*Primary Examiner* — Oneal R Mistry
*Assistant Examiner* — Justin Philip Cascais
(74) *Attorney, Agent, or Firm* — Quinn IP Law

(57)         ABSTRACT

A method of performing a camera to ground alignment for a camera system on a vehicle. The method includes determining if enabling conditions have occurred and estimating a location of a vanishing point in a source image. Ground lines are selected based on a source image. A lane line detection is performed based on clustering of the ground lines to determine lane lines in the source image. At least one of pitch, yaw, or roll of the vehicle are estimated from the source image. A cost function based on estimates of pitch, yaw, and roll is minimized to obtain an optimal pitch value, an optimal yaw value, an optimal roll value, and lane lines from the source image. A sliding window-based refinement is performed on source images. Alignment results are broadcast to a downstream application or it is determined if the camera system on the vehicle is misaligned.

20 Claims, 6 Drawing Sheets

(56)                 References Cited

OTHER PUBLICATIONS

Duong, Chung, Cho; Model-Based Robust Lane Detection for Driver Assistance; Journal of Korea Multimedia Society, 2014, 17. Jg., Nr. 6, S. 655-670.

* cited by examiner

SYSTEM AND METHOD FOR PERFORMING A CAMERA TO GROUND ALIGNMENT FOR A VEHICLE

INTRODUCTION

Vehicles are a staple of everyday life. Special use cameras, microcontrollers, laser technologies, and sensors may be used in many different applications in a vehicle. Cameras, microcontrollers and sensors may be utilized in enhancing automated structures that offer state-of-the-art experience and services to the customers, for example in tasks such as body control, camera vision, information display, security, autonomous controls, etc. Vehicular vision systems may also be used to assist in vehicle control.

SUMMARY

Disclosed herein is a method of performing a camera to ground alignment for a camera system on a vehicle. The method includes determining if a predetermined set of enabling conditions have occurred along a roadway and estimating a location of a vanishing point in a source image including the roadway. Ground lines are selected along the roadway based on a source image. A lane line detection is performed based on clustering of the ground lines to determine lane lines in the source image. At least one of pitch, yaw, or roll of the vehicle are estimated from the source image. A cost function based on estimates of pitch, yaw, and roll is minimized to obtain an optimal pitch value, an optimal yaw value, and an optimal roll value and lane lines from the source image. A sliding window-based refinement is performed on source images. Alignment results based on the sliding window refinement are broadcast to a downstream application or it is determined if the camera system on the vehicle is misaligned based on the sliding window-based refinement.

Another aspect of the disclosure may be where the source image is captured by at least one optical sensor on the vehicle.

Another aspect of the disclosure may be where the predetermined set of enabling conditions include a velocity along a first axis greater than a predetermined value, a velocity along a second axis less than a second predetermined value, and an acceleration along the first axis being within a predetermined range.

Another aspect of the disclosure may be where the predetermined set of enabling conditions include a steering angle being less than a predetermined value and distances between keyframes being greater than a predetermined distance value.

Another aspect of the disclosure may be where the vanishing point in the source image is estimated based on detecting a plurality of detected line segments in the source image with a point of convergence that corresponds to the vanishing point.

Another aspect of the disclosure may include re-estimating the vanishing point based on the plurality of ground lines along the roadway.

Another aspect of the disclosure may be where the plurality of ground lines is selected by detecting detected line segments in the source image, a horizon line is detected in the source image, and a lane mask is determined for the source image.

Another aspect of the disclosure may be where the plurality of ground lines is selected by eliminating a set of detected line segments in the source image that appear above the horizon line.

Another aspect of the disclosure may be where the ground lines are selected by selecting a set of the detected line segments adjacent to lane markings in the lane mask.

Another aspect of the disclosure may be where the lane line detection is performed based on clustering by grouping detected line segments into individual sets based a distance that each detected line segment in each of the individual sets is from an optimal lane line that passes through the vanishing point.

Another aspect of the disclosure may be where the pitch and yaw of the vehicle are estimated from the source image by comparing a location of the plurality of lane lines relative to the vanishing point.

Another aspect of the disclosure may be where the roll of the vehicle is estimated from the source image when the lane lines include three separate lane lines.

Another aspect of the disclosure may be where a roll angle of the vehicle is estimated from the source image occurs when the lane lines include at least two lane lanes of a given width.

Disclosed herein is a non-transitory computer-readable storage medium embodying programmed instructions which, when executed by a processor, are operable for performing a method. The method includes determining if a predetermined set of enabling conditions have occurred along a roadway and estimating a location of a vanishing point in a source image including the roadway. Ground lines are selected along the roadway based on a source image. A lane line detection is performed based on clustering of the ground lines to determine lane lines in the source image. At least one of pitch, yaw, or roll of the vehicle are estimated from the source image. A cost function based on estimates of pitch, yaw, and roll is minimized to obtain an optimal pitch value, an optimal yaw value, an optimal roll value, and lane lines from the source image. A sliding window-based refinement is performed on a plurality of source images. Alignment results based on the sliding window refinement are broadcast to a downstream application or it is determined if the camera system on the vehicle is misaligned based on the sliding window-based refinement.

Disclosed herein is a vehicle system. The system includes at least one optical sensor configured to capture a plurality of images and a controller in communication with the at least one optical sensor. The controller is configured to determine if a predetermined set of enabling conditions have occurred along a roadway, estimate a location of a vanishing point in a source image including the roadway, and select ground lines along the roadway based on a source image. The controller is also configured to perform a lane line detection based on clustering of the ground lines to determine lane lines in the source image and estimate at least one of pitch, yaw, or roll from the source image. The controller is also configured to minimize a cost function based on estimates of pitch, yaw, and roll to obtain an optimal pitch value, an optimal yaw value, an optimal roll value, and lane lines from the source image. The controller is further configured to perform a sliding window-based refinement on images and broadcast alignment results based on the sliding window refinement to a downstream application or determine if a camera system on the vehicle is misaligned based on the sliding window-based refinement.

Figure 1:
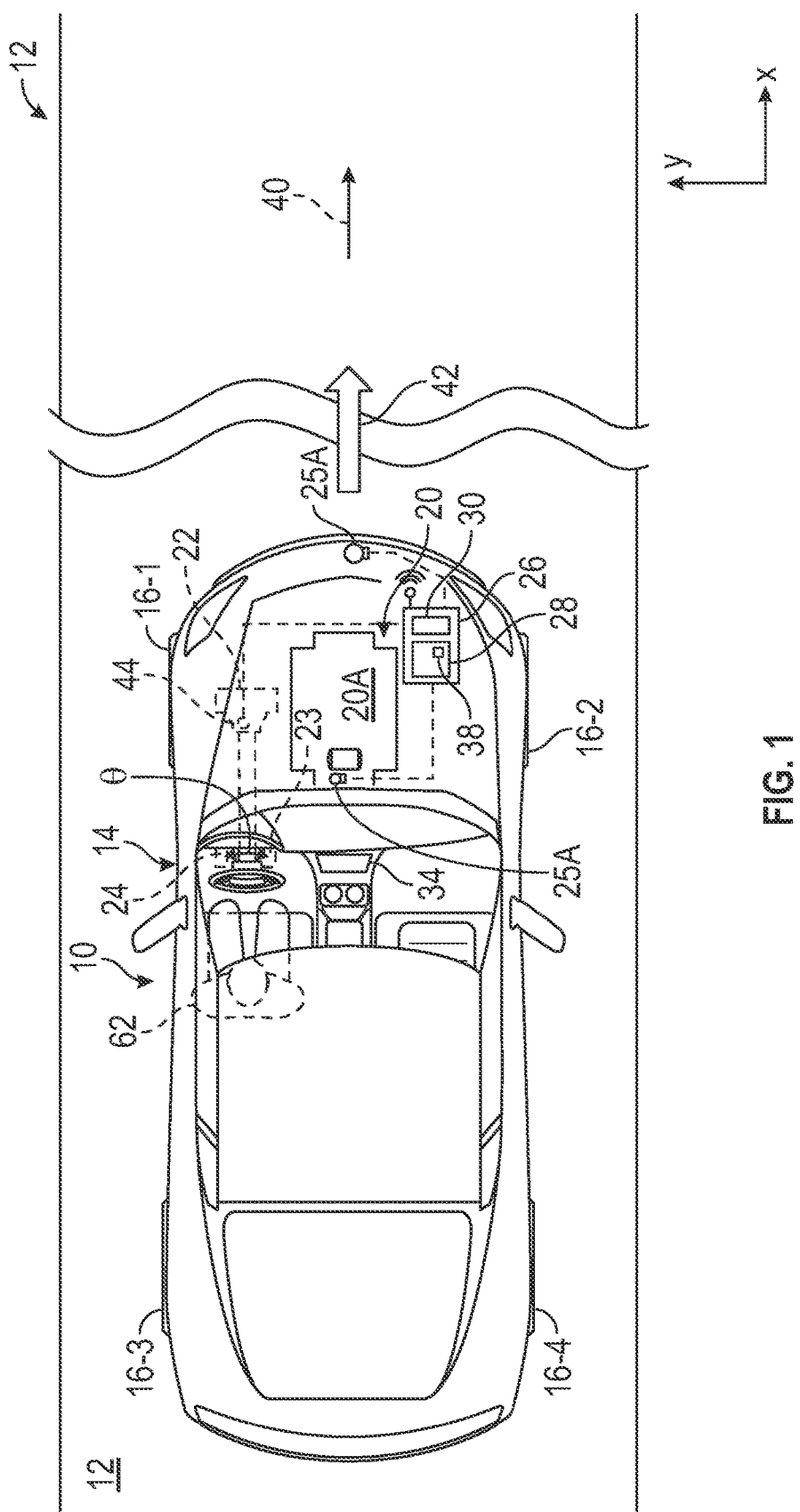
FIG. 1 is a schematic illustration of an example motor vehicle.

The present disclosure may be modified or embodied in alternative forms, with representative embodiments shown in the drawings and described in detail below. The present disclosure is not limited to the disclosed embodiments. Rather, the present disclosure is intended to cover alternatives falling within the scope of the disclosure as defined by the appended claims.

DETAILED DESCRIPTION

Those having ordinary skill in the art will recognize that terms such as "above," "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may include a number of hardware, software, and/or firmware components configured to perform the specified functions.

Referring to the FIGS., wherein like numerals indicate like parts referring to the drawings, wherein like reference numbers refer to like components, FIG. 1 shows a schematic view of a motor vehicle 10 positioned relative to a roadway, such as a vehicle lane 12. As shown in FIG. 1, the vehicle 10 includes a vehicle body 14, a first axle having a first set of road wheels 16-1, 16-2, and a second axle having a second set of road wheels 16-3, 16-4 (such as individual left-side and right-side wheels on each axle). Each of the road wheels 16-1, 16-2, 16-3, 16-4 employs tires configured to provide fictional contact with the vehicle lane 12. Although two axles, with the respective road wheels 16-1, 16-2, 16-3, 16-4, are specifically shown, nothing precludes the motor vehicle 10 from having additional axles.

As shown in FIG. 1, a vehicle suspension system operatively connects the vehicle body 14 to the respective sets of road wheels 16-1, 16-2, 16-3, 16-4 for maintaining contact between the wheels and the vehicle lane 12, and for maintaining handling of the motor vehicle 10. The motor vehicle 10 additionally includes a drivetrain 20 having a power-source or multiple power-sources 20A, which may be an internal combustion engine (ICE), an electric motor, or a combination of such devices, configured to transmit a drive torque to the road wheels 16-1, 16-2 and/or the road wheels 16-3, 16-4. The motor vehicle 10 also employs vehicle operating or control systems, including devices such as one or more steering actuators 22 (for example, an electrical power steering unit) configured to steer the road wheels 16-1, 16-2, a steering angle (θ), an accelerator device 23 for controlling power output of the power-source(s) 20A, a braking switch or device 24 for retarding rotation of the road wheels 16-1 and 16-2 (such as via individual friction brakes located at respective road wheels), etc.

As shown in FIG. 1, the motor vehicle 10 includes at least one sensor 25A and an electronic controller 26 that cooperate to at least partially control, guide, and maneuver the vehicle 10 in an autonomous mode during certain situations. As such, the vehicle 10 may be referred to as an autonomous vehicle. To enable efficient and reliable autonomous vehicle control, the electronic controller 26 may be in operative communication with the steering actuator(s) 22 configured as an electrical power steering unit, accelerator device 23, and braking device 24. The sensors 25A of the motor vehicle 10 are operable to sense the vehicle lane 12 and monitor a surrounding geographical area and traffic conditions proximate the motor vehicle 10.

The sensors 25A of the vehicle 10 may include, but are not limited to, at least one of a Light Detection and Ranging (LiDAR) sensor, radar, and camera systems, such as optical sensors, located around the vehicle 10 to detect the boundary indicators, such as edge conditions, of the vehicle lane 12. The type of sensors 25A, their location on the vehicle 10, and their operation for detecting and/or sensing the boundary indicators of the vehicle lane 12 and monitor the surrounding geographical area and traffic conditions are understood by those skilled in the art and are therefore not described in detail herein.

The electronic controller 26 is disposed in communication with the sensors 25A of the vehicle 10 for receiving their respective sensed data related to the detection or sensing of the vehicle lane 12 and monitoring of the surrounding geographical area and traffic conditions. The electronic controller 26 may alternatively be referred to as a control module, a control unit, a controller, a vehicle 10 controller, a computer, etc. The electronic controller 26 may include a computer and/or processor 28, and include software, hardware, memory, algorithms, connections (such as to sensors 25A), etc., for managing and controlling the operation of the vehicle 10. As such, a method, described below and generally represented in FIG. 2, may be embodied as a program or algorithm partially operable on the electronic controller 26. It should be appreciated that the electronic controller 26 may include a device capable of analyzing data from the sensors 25A, comparing data, making the decisions required to control the operation of the vehicle 10, and executing the required tasks to control the operation of the vehicle 10.

The electronic controller 26 may be embodied as one or multiple digital computers or host machines each having one or more processors 28, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics. The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a flexible disk, hard disk, magnetic tape or other magnetic medium, a CD-ROM, DVD, and/or other optical medium, as well as other possible memory devices such as flash memory.

The electronic controller 26 includes a tangible, non-transitory memory 30 on which computer-executable instructions, including one or more algorithms, are recorded for regulating operation of the motor vehicle 10. The subject algorithm(s) may specifically include an algorithm configured to monitor localization of the motor vehicle 10 and determine the vehicle's heading relative to a mapped vehicle trajectory on a particular road course to be described in detail below.

The motor vehicle 10 also includes a vehicle navigation system 34, which may be part of integrated vehicle controls, or an add-on apparatus used to find travel direction in the vehicle. The vehicle navigation system 34 is also operatively connected to a global positioning system (GPS) 36 using an earth orbiting satellite. The vehicle navigation system 34 in connection with the GPS 36 and the above-mentioned sensors 25A may be used for automation of the vehicle 10. The electronic controller 26 is in communication with the GPS 36 via the vehicle navigation system 34. The vehicle navigation system 34 uses a satellite navigation device (not shown) to receive its position data from the GPS 36, which is then correlated to the vehicle's position relative to the surrounding geographical area. Based on such information, when directions to a specific waypoint are needed, routing to such a destination may be mapped and calculated. On-the-fly terrain and/or traffic information may be used to adjust the route. The current position of a vehicle 10 may be calculated via dead reckoning—by using a previously determined position and advancing that position based upon given or estimated speeds over elapsed time and course by way of discrete control points.

The electronic controller 26 is generally configured, i.e., programmed, to determine or identify localization 38 (current position in the X-Y plane, shown in FIG. 1), velocity, acceleration, yaw rate, as well as intended path 40, and heading 42 of the motor vehicle 10 on the vehicle lane 12. The localization 38, intended path 40, and heading 42 of the motor vehicle 10 may be determined via the navigation system 34 receiving data from the GPS 36, while velocity, acceleration (including longitudinal and lateral g's), and yaw rate may be determined from vehicle sensors 25A. Alternatively, the electronic controller 26 may use other systems or detection sources arranged remotely with respect to the vehicle 10, for example a camera, to determine localization 38 of the vehicle relative to the vehicle lane 12.

As noted above, the motor vehicle 10 may be configured to operate in an autonomous mode guided by the electronic controller 26 to transport an occupant 62. In such a mode, the electronic controller 26 may further obtain data from vehicle sensors 25A to guide the vehicle along the desired path, such as via regulating the steering actuator 22. The electronic controller 26 may be additionally programmed to detect and monitor the steering angle (0) of the steering actuator(s) 22 along the desired path 40, such as during a negotiated turn. Specifically, the electronic controller 26 may be programmed to determine the steering angle (0) via receiving and processing data signals from a steering position sensor 44 (shown in FIG. 1) in communication with the steering actuator(s) 22, accelerator device 23, and braking device 24.

Figure 2:
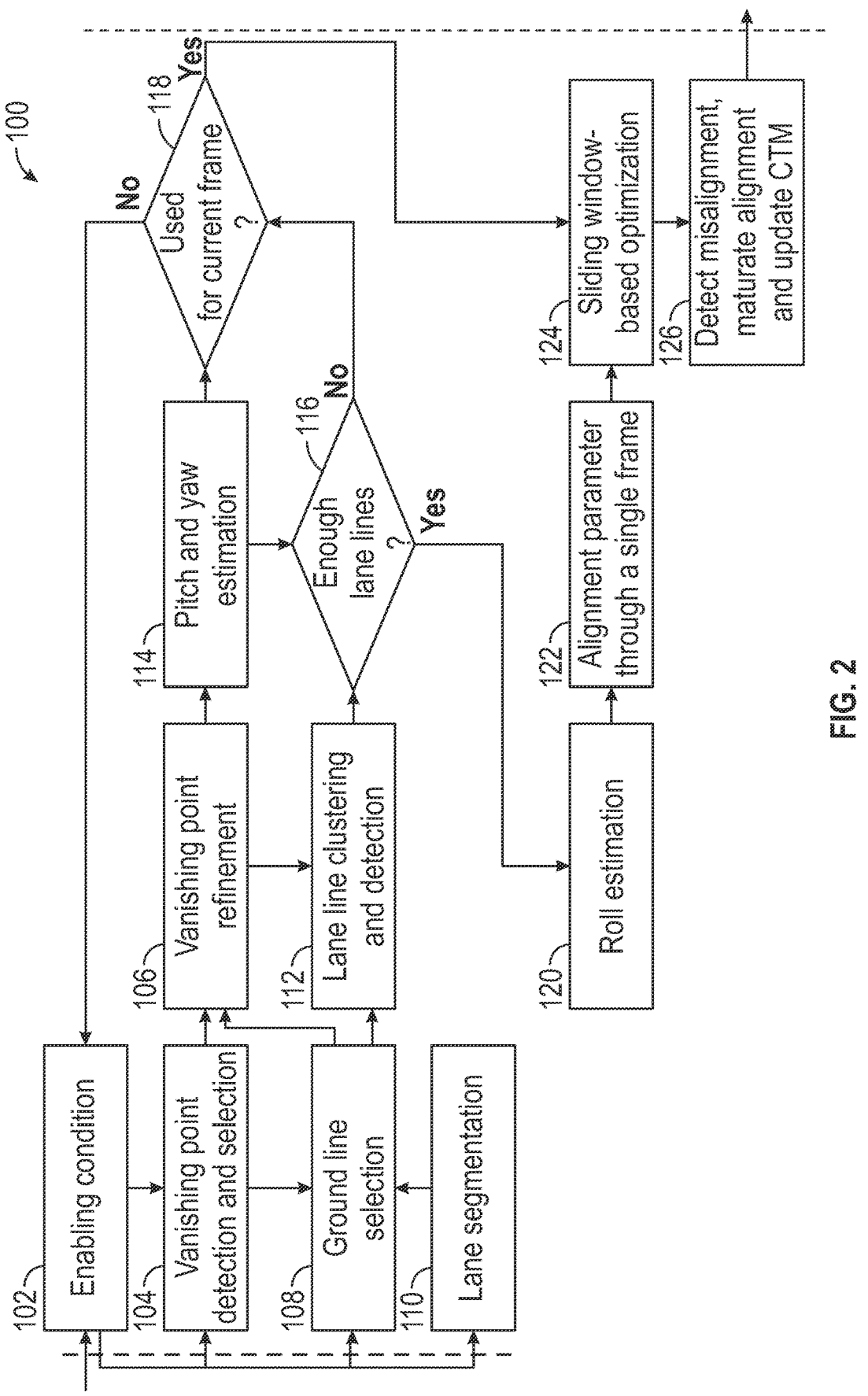
FIG. 2 illustrates an example method of aligning a sensor on the motor vehicle of FIG. 1.

FIG. 2 illustrates a flow diagram of the method 100 of performing a camera system to ground alignment. The method 100 begins at Block 102 by determining if at least one enabling condition or a predetermined set of enabling conditions are met. The enabling conditions can include at least one of a norm of a vehicle velocity along ground x-axis being greater than a predetermined velocity ($\|v_x\| > v_u$), a norm of a vehicle velocity along ground y-axis being less than a predetermined velocity ($\|v_y\| < v_l$), acceleration along ground x-axis being within a predetermined range ($a_v < \|a_x\| < a_u$), steering angle less than a predetermined value ($\|\theta\| < \theta_u$), or a distance between keyframes being greater than a predetermined value ($\|v\| \Delta t > W_u$). Additionally, the enabling conditions can include points of vehicle egress being closed or a temporal comparison between images for lane masks to ensure straight lane driving. The enabling conditions can also no rainy conditions, low light, snow, fog, or spare tire. Furthermore, in one example, each of the above enabling conditions may need to be met in order to proceed to Block 104.

Figure 3:
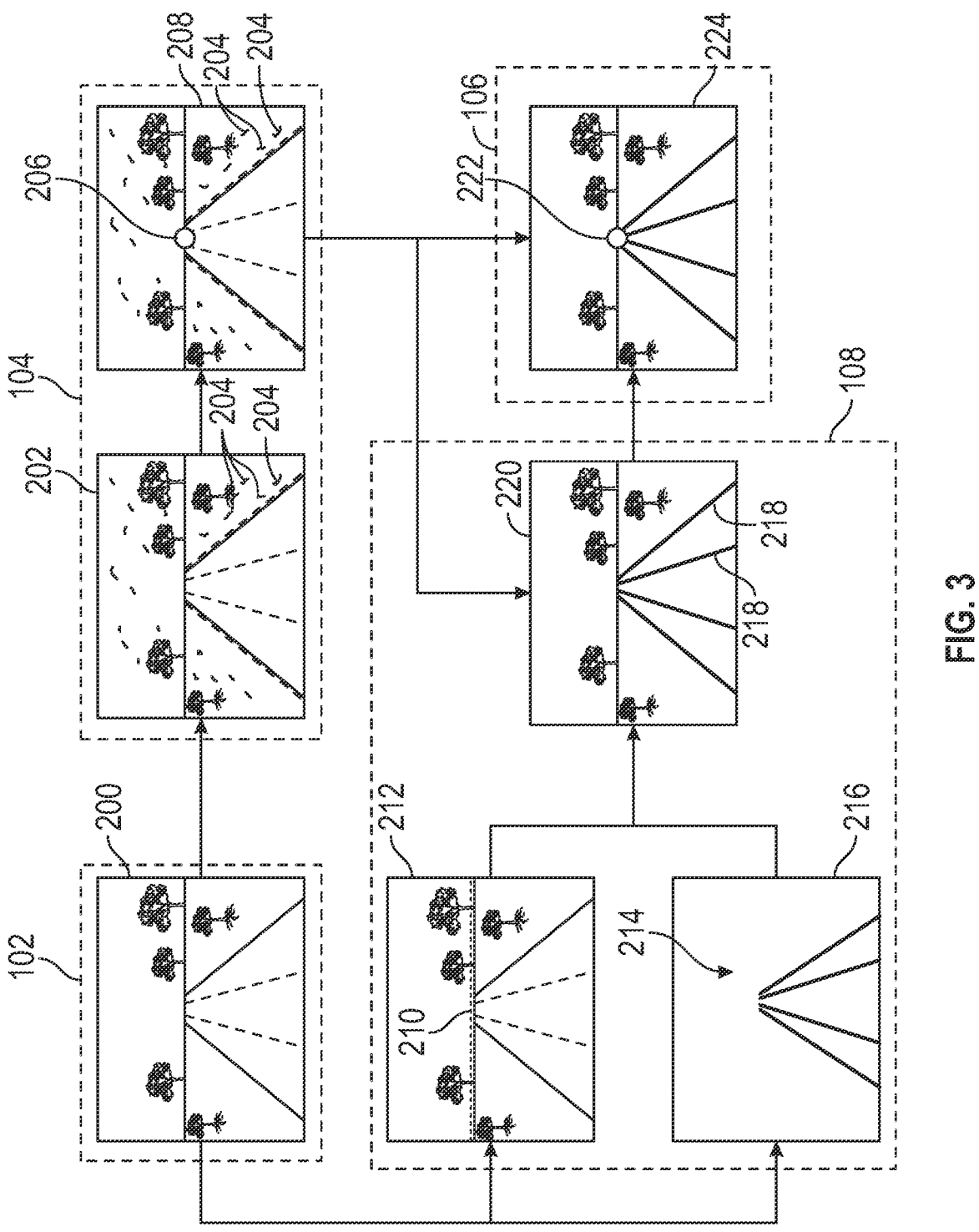
FIG. 3 illustrates a graphical representation of a portion of the method of FIG. 2.

At Block 104, the method 100 performs an initial vanishing point detection and selection as shown in FIGS. 2-3. FIG. 3 provides a graphical representation of the source image 200 moving from Block 102 through Blocks 104, 106, and 108. The initial vanishing point detection will be re-estimated or refined at Block 106 as discussed in greater detail below. At Block 102 a source image 200 is obtained for analysis as shown in FIGS. 2-3. The analysis includes performing a line segment detection on the source image 200 at Block 104 to obtain a line segmented image 202 having multiple detected line segments 204 identified from the source image 200 with the detected line segments overlaid on the source image 200. Block 104 utilizes the detected line segments 204 to determine a location of an initial vanishing point 206 in an initial vanishing point detection image 208. In particular, the initial vanishing point 206 is located in the initial vanishing point detection image 208 adjacent to a point of termination of the detected line segments 204. EQ. 1 below provides the uncertainty of the vanishing point.

$$\mathrm{cov}\,(p_v) = J_{p_v}\,\mathrm{cov}\,\big([\alpha,\ \beta,\ \gamma,\ t_3]^T\big)J_{p_v}^T \qquad\qquad \text{EQ. 1}$$

In EQ. 1 above, $p_v$ and $J_{p_v}$ are provided in EQ. 2 and EQ. 3, respectively.

$$p_v = \lambda_c^g Hv \qquad\qquad \text{EQ. 2}$$

$$J_{p_v} = \frac{\partial p_v}{\partial(\alpha,\ \beta,\ \gamma,\ t_3)} \qquad\qquad \text{EQ. 3}$$

Also, $\mathrm{cov}([\alpha,\ \beta,\ \gamma,\ t_3]^T)$ in EQ. 1 above is provided from manufacturing alignment of the camera system that forms at least a part of the sensors 25A. With the above information, a vanishing point is selected by determining a point that satisfies EQ. 4 below.

$$p_v^T\,\mathrm{cov}\,(p_v)p_v \le F^{-1}\big(1 - \eta/2\big) \qquad\qquad \text{EQ. 4}$$

In the above $$\text{EQS.,}\ {}_c^g H = K[\,r_1\quad r_2\quad t\,],$$

a vanishing direction $v=[1\ 0\ 0]^T$, t is a ground to camera translation, $t_i$ is the i-th element of t, $F^{-1}(x)$ is the inverse cumulative probability function of $\chi 2$-distribution with 2 degrees of freedom, K is a camera intrinsic matrix, $\alpha$ is roll angle, $\beta$ is pitch angle, $\gamma$ is yaw angle, and $r_i$ is the i-column of $R(\alpha,\ \beta,\ \gamma)$ with $R(\alpha,\ \beta,\ \gamma)$ represented in EQ. 5 below.

$$R_z(\gamma)R_y(\beta)R_x(\alpha) = \hspace{3cm} \text{EQ. 5}$$

$$\begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} 1 & 0 & 0 \\ 0 & \cos\alpha & -\sin\alpha \\ 0 & \sin\alpha & \cos\alpha \end{bmatrix}$$

At Block 108, ground line selection occurs. The ground line selection occurs as shown in FIGS. 2-3 by utilizing the initial vanishing point 206 from Block 104, a horizon line 210 shown in horizon line image 212 of FIG. 3, and a lane mask 214 shown in mask image 216 of Block 104, and lane segmentation occurring at Block 110. Non-ground line segments shown by the detected line segments 204 of image 202 are removed from the initial vanishing point detection image 208 by utilizing the horizon line 210 from image 212 to produce a ground line image 220 having ground lines 218. The horizon line In is determined by the following two points in the image ($r_{ij}$ is the element of the i-th row and j-th col. of R ($\alpha$, $\beta$, $\gamma$)). If $r_{31} \neq 0$ and $r_{32} \neq 0$, $\check{p}_1$ and $\check{p}_2$ are provided by EQS. 6 and 7 below.

$$\check{p}_1 = K \begin{bmatrix} \frac{r_{11}}{r_{31}} \\ \frac{r_{21}}{r_{31}} \\ 1 \end{bmatrix} \hspace{2cm} \text{EQ. 6}$$

$$\check{p}_2 = K \begin{bmatrix} \frac{r_{12}}{r_{32}} \\ \frac{r_{22}}{r_{32}} \\ 1 \end{bmatrix} \hspace{2cm} \text{EQ. 7}$$

If $r_{31} = 0$ and $r_{32} \neq 0$, $\check{p}_1$ and $\check{p}_2$ are provided by EQS. 8 and 9 below.

$$\check{p}_1 = K \begin{bmatrix} \frac{r_{12}}{r_{33}} \\ \frac{r_{22}}{r_{32}} \\ 1 \end{bmatrix} \hspace{2cm} \text{EQ. 8}$$

$$\check{p}_1 = K \begin{bmatrix} \frac{r_{12}}{r_{33}} \\ \frac{r_{22}}{r_{32}} \\ 1 \end{bmatrix} \hspace{2cm} \text{EQ. 9}$$

If $r_{31} \neq 0$ and $r_{32} = 0$, $\check{p}_1$ and $\check{p}_2$ are provided by EQS. 10 and 11 below.

$$\check{p}_1 = K \begin{bmatrix} \frac{r_{11}}{r_{31}} \\ \frac{r_{21}}{r_{31}} \\ 1 \end{bmatrix} \hspace{2cm} \text{EQ. 10}$$

$$\check{p}_1 = K \begin{bmatrix} \frac{r_{11}}{r_{31}} \\ \frac{r_{21}}{r_{31}} \\ 1 \end{bmatrix} \hspace{2cm} \text{EQ. 11}$$

Furthermore, if $r_{31}$ and $r_{32}$ are both equal to zero, the camera system cannot observe the ground 12. Line segments that have endpoints p satisfying $l_n \check{p} > 0$ are selected to re-estimate a refined vanishing point 222 in refined image 224.

given ground line segments at Block 106. Choose ground line segment (select line seg. l that is close to the lane mask) as shown in EQ. 12 below with m being a pixel considered to be a lane, M being a lane pixel set, and & being a predetermined threshold variable.

$$\max_{p \in l, m \in M} \|p - m\| < \varepsilon \hspace{2cm} \text{EQ. 12}$$

Figure 4:
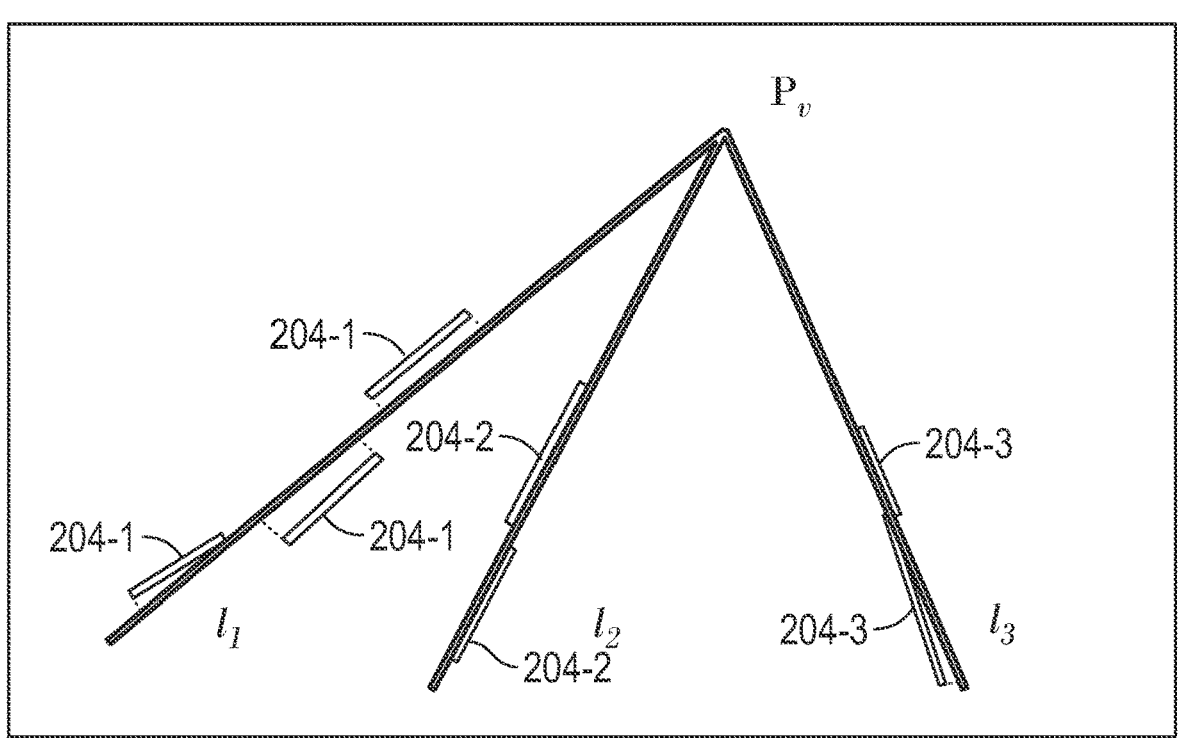
FIG. 4 illustrates clustering of detected line segments for determining lane lines as part of the method of FIG. 2.

At Block 112, line segments are clustered into different groups with the detected line segments 204 in the same group belonging to the same lane line l. As shown in FIG. 4, a first group of line segments 204-1 are clustered around line 41, a second group of line segments 204-2 are clustered around line 12, and a third group of line segments 204-3 are clustered around line $l_3$ such that the line segments 204 are associated with the corresponding line l. Line segments 204 that are outliers are eliminated as noise.

Figure 5:
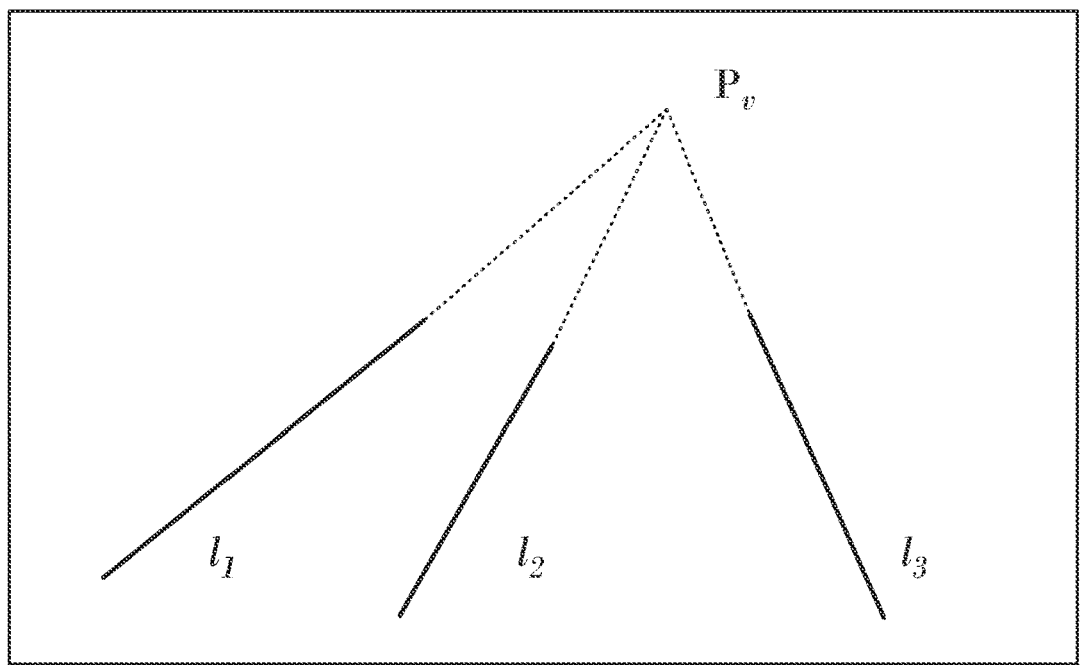
FIG. 5 illustrates lane lines converging on a common vanishing point.

For lane line detection, a lane line is generated for each of the line segments that are in the same group as shown in FIG. 5. For each line in set L=∪l that has the same label, the optimal lane line l*$_+$ should pass through the vanishing point $p_v$ re-estimated from the ground line segments with l*$_+ p_v$=0 and have the smallest distance to the line segments in set L. The optimal lane line is obtained with EQ. 13 below for line segments with the same labels.

$$\arg\min_{l+} \sum_{p \in l, l \in L} \left\| l_+^T p \right\| \hspace{2cm} \text{EQ. 13}$$

At Block 114, the pitch ($\beta$) and yaw ($\gamma$) of the vehicle 10 are estimated. Given EQ. 5 above, and the vanishing direction v=[1 0 0]$^T$, the pitch ($\beta$) and yaw ($\gamma$) can be obtained from EQS. 14 and 15 below where R is the rotation matrix from ground to camera, K is the camera intrinsic matrix, and $\lambda$ is a scaling factor.

$$p_v = \lambda KRv \hspace{2cm} \text{EQ. 14}$$

$$K^{-1} \begin{bmatrix} p_x \\ p_y \\ 1 \end{bmatrix} = \lambda \begin{bmatrix} \cos\beta \sin\gamma \\ \cos\beta \sin\gamma \\ -\sin\beta \end{bmatrix} \hspace{1cm} \text{EQ. 15}$$

At Block 116, the method 100 then determines if enough lanes were detected. If enough lanes were detected, the method 100 proceeds to Block 120 to perform a roll ($\alpha$) angle estimation. If there were not enough lanes detected, the method 100 proceeds to Block 118. At Block 118, the method 100 determines if pitch and yaw estimations are reliable. If the pitch and yaw estimations are determined to be reliable, the method 100 returns to Block 102 to determine if enabling conditions are satisfied. If the pitch and yaw estimations are reliable, the method 100 proceeds to Block 124 to perform a sliding window-based optimization to further refine the pitch and yaw estimations as will be discussed further below.

When the method proceeds from Block 116 to Block 120, the method 100 performs the roll ($\alpha$) angle estimation. The method 100 estimates roll ($\alpha$) angle from the source image 200 through the lane lines that were detected as described above. In one example, EQ. 16 below leads to the development of EQ. 17.

$$_c^g H = K[\, r_1 \quad r_2 \quad t\,] \qquad \text{EQ. 16}$$

$$l_i' = {}_c^g H^T l_i \qquad \text{EQ. 17}$$

Figure 6:
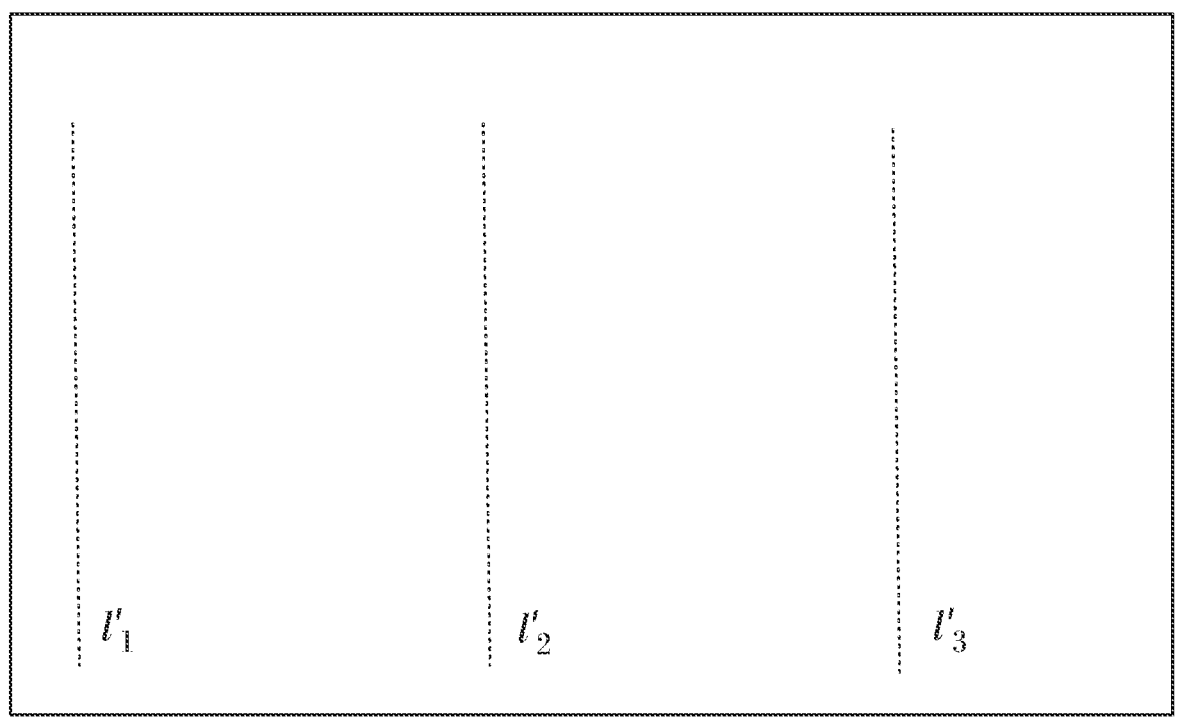
FIG. 6 illustrates lanes lines having a given width between adjacent lane lines.

In EQ. 16 above, $r_i$ is the i column of R, t is a ground to camera translation vector, and W is a lane width. With EQ. 17, Block 120 can utilize EQ. 18 to determine the roll ($\alpha$) angle from a single source image 200 if there are three separate lane lines present, as shown in FIG. 5 or EQ 19 if just two-lane lines are detected having a given lane width between adjacent lane lines as shown in FIG. 6.

$$\left\| \lfloor l_1' \rfloor_\times \begin{bmatrix} 1 \\ 0 \\ 0 \end{bmatrix} - \lfloor l_2' \rfloor_\times \begin{bmatrix} 1 \\ 0 \\ 0 \end{bmatrix} \right\| - \left\| \lfloor l_2' \rfloor_\times \begin{bmatrix} 1 \\ 0 \\ 0 \end{bmatrix} - \lfloor l_3' \rfloor_\times \begin{bmatrix} 1 \\ 0 \\ 0 \end{bmatrix} \right\| = 0 \qquad \text{EQ. 18}$$

$$\left\| \lfloor l_1' \rfloor_\times \begin{bmatrix} 1 \\ 0 \\ 0 \end{bmatrix} - \lfloor l_2' \rfloor_\times \begin{bmatrix} 1 \\ 0 \\ 0 \end{bmatrix} \right\| - W = 0 \qquad \text{EQ. 19}$$

From Block 120, the method 100 proceeds to Block 122 to determine at least one alignment parameter through a single one of the source images 200. To obtain the lane lines in vehicle coordinates, the method 100 minimizes the cost equation in EQ. 20 below to obtain initial estimates of ($\alpha$, $\beta$, $\gamma$) to obtain optimal $\alpha_k$, $\beta_k$, and $\gamma_k$ and lane lines in a single image. When the method 100 identifies lane lines that are parallel to the vehicle 20 driving direction (FIG. 5), the method 100 utilizes EQ. 20 below. When the method 100 identifies lanes lines with an equal lane width (FIG. 6), the method 100 can utilize either of EQS. 21 or 22 below with $\omega_0$ being a weighting factor and W being the lane width.

$$f_a(\alpha, \beta, \gamma, i) = l_i^T {}_c^g H \begin{bmatrix} 1 \\ 0 \\ 0 \end{bmatrix} \qquad \text{EQ. 20}$$

$$f_w(\alpha, \beta, \gamma, i) = \sum_i \left\| \lfloor {}_c^g H^T l_i \rfloor_\times \begin{bmatrix} 1 \\ 0 \\ 0 \end{bmatrix} - \lfloor {}_c^g H^T l_{i+1} \rfloor_\times \begin{bmatrix} 1 \\ 0 \\ 0 \end{bmatrix} \right\| - \qquad \text{EQ. 21}$$

$$\left\| \lfloor {}_c^g H^T l_{i+1} \rfloor_\times \begin{bmatrix} 1 \\ 0 \\ 0 \end{bmatrix} - \lfloor {}_c^g H^T l_{i+1} \rfloor_\times \begin{bmatrix} 1 \\ 0 \\ 0 \end{bmatrix} \right\|$$

$$f_w(\alpha, \beta, \gamma, i) = \sum_i \left\| \lfloor {}_c^g H^T l_i \rfloor_\times \begin{bmatrix} 1 \\ 0 \\ 0 \end{bmatrix} - \lfloor {}_c^g H^T l_{i+1} \rfloor_\times \begin{bmatrix} 1 \\ 0 \\ 0 \end{bmatrix} - W \right\| \qquad \text{EQ. 22}$$

From Block 122, the method 100 proceeds to Block 124 to perform a sliding window-based optimization on multiple images, such as multiple source images. In a first example, the roll, pitch, and yaw parameters are refined in the sliding window by minimizing EQ. 23 below.

$$f_s(\alpha, \beta, \gamma) = \frac{1}{2} \sum_k f_i(\alpha, \beta, \gamma) + \omega_1 tr\left(R^T(\alpha, \beta, \gamma) R(\alpha_k, \beta_k, \gamma_k) - 1\right) \qquad \text{EQ. 23}$$

In a second example, the minimization or optimization can occur for the roll, pitch, yaw, and ground to camera center height ($t_3$) and replace $f_w(\alpha, \beta, \gamma, i)$ in $f_i(\alpha, \beta, \gamma, i)$ with EQ. 24 below where ${}_c^g H = K\ [r_1 \quad r_2 \quad t]$ considering $t_3$ is unknown and W is the lane width.

$$f_w(\alpha, \beta, \gamma, i) = \sum_i \left\| \lfloor {}_c^g H^T l_i \rfloor_\times \begin{bmatrix} 1 \\ 0 \\ 0 \end{bmatrix} - \lfloor {}_c^g H^T l_{i+1} \rfloor_\times \begin{bmatrix} 1 \\ 0 \\ 0 \end{bmatrix} - W \right\| \qquad \text{EQ. 24}$$

Additionally, the following updates are made: $X_{k+1} = X_k - (J^T J + \lambda \mathrm{diag}(J^T J))^{-1} J^T f_s$, $X_k = [\alpha, \beta, \gamma]^T$ if case 1 else $[\alpha, \beta, \gamma, t_3]^T$, and $J = \partial f / \partial X_k$ for the second case. In the above EQS., A is a damping factor, $\omega_1$ is a weighting factor, and $t_3$ is the third element of t (ground to camera center height). The lane width W can be obtained from a map or another active sensor like LiDAR with sensors 25A and 1 is a 3×3 identity matrix.

Figure 7:
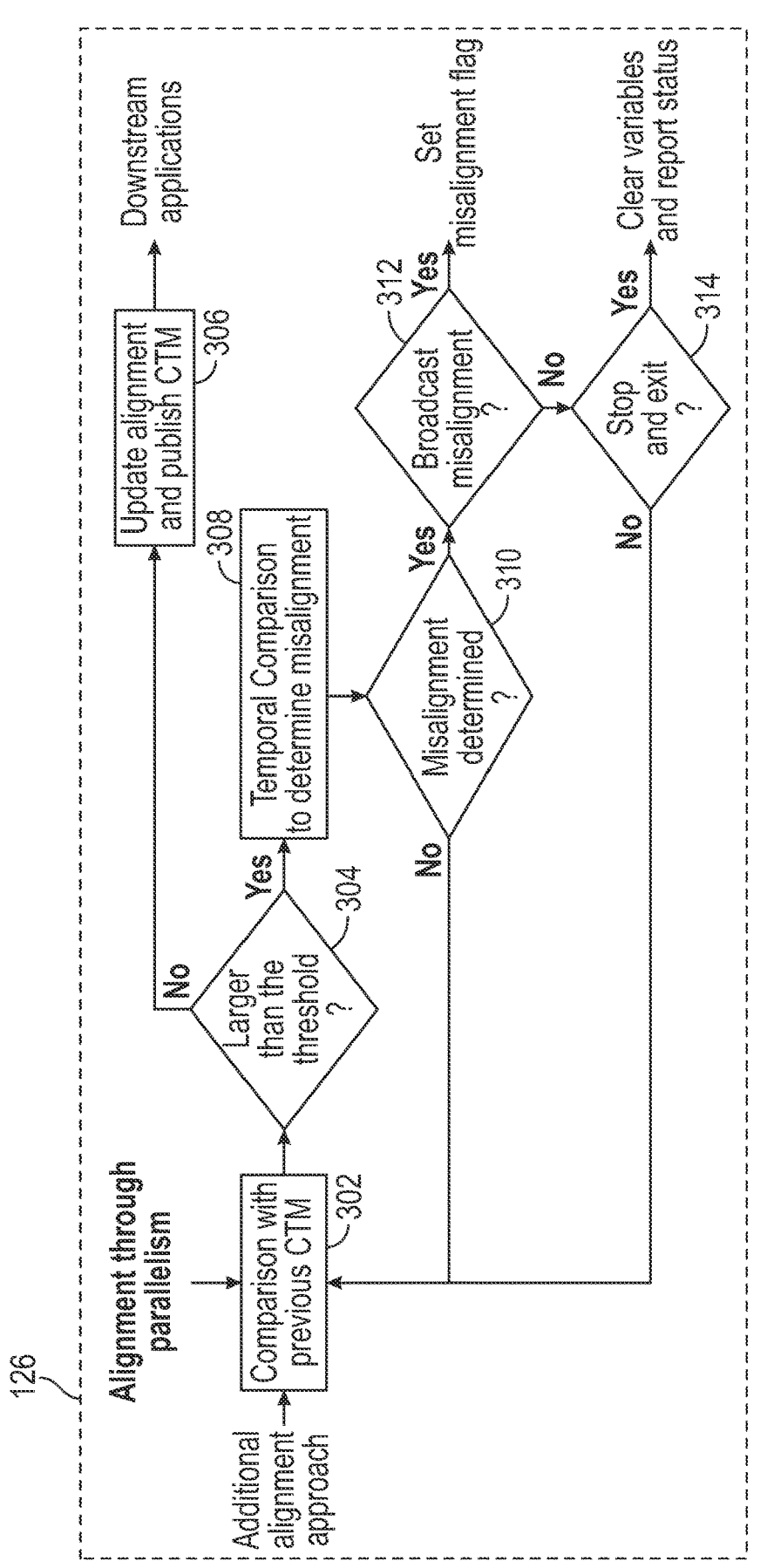
FIG. 7 illustrates an expanded explanation of a Block from the method of FIG. 2.

At Block 126, the method 100 detects misalignment, maturates alignment parameters, and updates a coordination transformation matrix (CTM) for use by downstream applications. The CTM stores alignment results to characterize a transformation from one coordinate system to another coordinate system, such as a camera coordinate system to a vehicle coordinate system. In one example, the downstream applications can include at least one of perception-based applications, low velocity maneuvers (LVM) applications, such as automatic parking or unparking, or viewing applications. FIG. 7 provides an additional example implementation of the steps occurring at Block 126.

In one example, the detection of misalignment can occur by alignment through parallelism with one additional alignment approach, such as a feature-based alignment, through the use of the alignment parameters determined from the sliding window-based optimization at Block 124. Additional alignment approaches are described in detail in commonly owned, co-pending U.S. patent application Ser. No. 17/651, 407, U.S. patent application Ser. No. 17/651,405, U.S. patent application Ser. No. 17/651,406 and U.S. Pat. No. 8,373,763, the disclosure of which is incorporated by reference herein in its entirety. The alignment through parallelism and the additional alignment approach are then compared to a previous CTM at Block 302. From Block 302, the method 100 determines if the comparison with at least one of the above approaches is greater than a predetermined threshold at Block 304. If the difference between the at least one of the above approaches is less than the predetermined threshold, the method 100 proceeds to Block 306 and updates the alignment and publishes the CTM. This information can then be used by downstream applications.

If the difference between the approaches and the CTM is larger than the predetermined threshold, the method 100 proceeds to Block 308 within Block 126 as shown in FIG. 7. At Block 308 a temporal comparison to determine misalignment occurs. If misalignment is not determined, the method 100 returns to Block 302. If misalignment is determined at Block 310, the method 100 proceeds to Block 312 and determines if the misalignment or alignment should be broadcast. If the misalignment or alignment should be broadcast, the method 100 can set a misalignment flag. If the misalignment should not be broadcast, the method 100 proceeds to Block 314 and determines the method 100 should stop and exit. If the method 100 should stop and exit, the method 100 clears the variables and report status. If not, the method 100 proceeds to Block 302.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic)

described in connection with the aspect is included in at least one aspect described herein, and may or may not be present in other aspects. In addition, it is to be understood that the described elements may be combined in a suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the scope thereof. Therefore, it is intended that the present disclosure not be limited to the particular embodiments disclosed but will include embodiments falling within the scope thereof.

What is claimed is:

1. A method of performing a camera to ground alignment for a camera system on a vehicle, the method comprising:
determining if a predetermined set of enabling conditions has occurred along a roadway, wherein the predetermined set of enabling conditions includes a velocity along a first axis greater than a predetermined value, a velocity along a second axis less than a second predetermined value, and an acceleration along the first axis being within a predetermined range;
estimating a location of a vanishing point in a source image including the roadway;
selecting a plurality of ground lines along the roadway based on the source image;
performing a lane line detection based on clustering of the plurality of ground lines to determine a plurality of lane lines in the source image;
estimating at least one of pitch, yaw, or roll of the vehicle from the source image;
minimizing a cost function based on estimates of pitch, yaw, and roll to obtain an optimal pitch value, an optimal yaw value, an optimal roll value, and lane lines from the source image;
performing a sliding window-based refinement on a plurality of source images; and
broadcasting results based on the sliding window refinement to a downstream application or determining if the camera system on the vehicle is misaligned based on the sliding window-based refinement.

2. The method of claim 1, wherein the source image is captured by at least one optical sensor on the vehicle.

3. The method of claim 1, wherein the predetermined set of enabling conditions includes a steering angle being less than a predetermined value and distances between keyframes being greater than a predetermined distance value.

4. The method of claim 1, wherein estimating the vanishing point in the source image is based on detecting a plurality of detected line segments in the source image with a point of convergence that corresponds to the vanishing point.

5. The method of claim 4, including re-estimating the vanishing point based on the plurality of ground lines along the roadway.

6. The method of claim 1, wherein selecting the plurality of ground lines includes detecting a plurality of detected line segments in the source image, detecting a horizon line in the source image, and determining a lane mask for the source image.

7. The method of claim 6, wherein selecting the plurality of ground lines includes eliminating a set of the plurality of detected line segments in the source image that appear above the horizon line.

8. The method of claim 7, wherein selecting the plurality of ground lines includes selecting a set of the plurality of detected line segments adjacent to lane markings in the lane mask.

9. The method of claim 1, wherein performing the lane line detection based on clustering includes grouping a plurality of detected line segments into individual sets based on a distance that each detected line segment in each of the individual sets is from an optimal lane line that passes through the vanishing point.

10. The method of claim 1, wherein estimating the pitch and yaw of the vehicle from the source image is based on comparing a location of the plurality of lane lines relative to the vanishing point.

11. The method of claim 1, wherein estimating the roll of the vehicle from the source image when the plurality of lane lines includes three separate lane lines.

12. The method of claim 1, wherein estimating a roll angle of the vehicle from the source image occurs when the plurality of lane lines includes at least two lane lanes of a given width.

13. A non-transitory computer-readable storage medium embodying programmed instructions which, when executed by a processor, are operable for performing a method comprising:
determining if a predetermined set of enabling conditions has occurred along a roadway, wherein the predetermined set of enabling conditions includes a velocity along a first axis greater than a predetermined value, a velocity along a second axis less than a second predetermined value, and an acceleration along the first axis being within a predetermined range;
estimating a location of a vanishing point in a source image including the roadway;
selecting a plurality of ground lines along the roadway based on the source image;
performing a lane line detection based on clustering of the plurality of ground lines to determine a plurality of lane lines in the source image;
estimating at least one of pitch, yaw, or roll of a vehicle from the source image;
minimizing a cost function based on estimates of pitch, yaw, and roll to obtain an optimal pitch value, an optimal yaw value, and an optimal roll value, lane lines from the source image;
performing a sliding window-based refinement on a plurality of images; and
broadcasting results based on the sliding window refinement to a downstream application or determining if a camera system on the vehicle is misaligned based on the sliding window-based refinement.

14. The method of claim 13, wherein the at least one enabling condition includes a steering angle being less than a predetermined value and distances between keyframes being greater than a predetermined distance value.

15. The non-transitory computer-readable storage medium of claim 13, wherein the source image is captured by at least one optical sensor on the vehicle.

16. The non-transitory computer-readable storage medium of claim 13, wherein the at least one enabling condition includes a steering angle being less than a predetermined value and distances between keyframes being greater than a predetermined distance value.

17. The non-transitory computer-readable storage medium of claim 13, wherein estimating the vanishing point in the source image is based on detecting a plurality of detected line segments in the source image with a point of convergence that corresponds to the vanishing point.

18. The non-transitory computer-readable storage medium of claim 17, including re-estimating the vanishing point based on the plurality of ground lines along the roadway.

19. The non-transitory computer-readable storage medium of claim 13, wherein selecting the plurality of ground lines includes:

detecting a plurality of detected line segments in the source image, detecting a horizon line in the source image, and determining a lane mask for the source image;

eliminating a set of the plurality of detected line segments in the source image that appear above the horizon line; and selecting a set of the plurality of detected line segments adjacent to lane markings in the lane mask.

20. A vehicle comprising:

at least one optical sensor configured to capture a plurality of images;

a controller in communication with the at least one optical sensor, wherein the controller is configured to:

determine if a predetermined set of enabling conditions has occurred along a roadway, wherein the predetermined set of enabling conditions includes a velocity along a first axis greater than a predetermined value, a velocity along a second axis less than a second predetermined value, and an acceleration along the first axis being within a predetermined range;

estimate a location of a vanishing point in a source image including the roadway;

select a plurality of ground lines along the roadway based on the source image;

perform a lane line detection based on clustering of the plurality of ground lines to determine a plurality of lane lines in the source image;

estimate at least one of pitch, yaw, or roll from the source image;

minimize a cost function based on estimates of pitch, yaw, and roll to obtain an optimal pitch value, an optimal yaw value, an optimal roll value, and lane lines from the source image;

perform a sliding window-based refinement on a plurality of images; and broadcast results based on the sliding window refinement to a downstream application or determine if a camera system on the vehicle is misaligned based on the sliding window-based refinement.

* * * * *